US011192208B2

(12) United States Patent
Bakker et al.

(10) Patent No.: US 11,192,208 B2
(45) Date of Patent: Dec. 7, 2021

(54) APPARATUS FOR PRODUCING AN OBJECT BY MEANS OF ADDITIVE MANUFACTURING AND METHOD OF USING THE APPARATUS

(71) Applicant: ADDITIVE INDUSTRIES B.V., Eindhoven (NL)

(72) Inventors: Thomas Martinus Gerardus Bakker, Eindhoven (NL); Mark Johannes Magielsen, Eindhoven (NL)

(73) Assignee: ADDITIVE INDUSTRIES B.V., Eindhoven (NL)

( * ) Notice: Subject to any disclaimer, the term of this patent is extended or adjusted under 35 U.S.C. 154(b) by 382 days.

(21) Appl. No.: 16/317,349

(22) PCT Filed: Jul. 13, 2017

(86) PCT No.: PCT/NL2017/050474

§ 371 (c)(1),
(2) Date: Jan. 11, 2019

(87) PCT Pub. No.: WO2018/012974

PCT Pub. Date: Jan. 18, 2018

(65) Prior Publication Data

US 2019/0314931 A1 Oct. 17, 2019

(30) Foreign Application Priority Data

Jul. 13, 2016 (NL) ..................................... 2017161

(51) Int. Cl.
*B33Y 10/00* (2015.01)
*B33Y 30/00* (2015.01)
(Continued)

(52) U.S. Cl.
CPC ........ *B23K 26/342* (2015.10); *B23K 26/0093* (2013.01); *B23K 26/02* (2013.01);
(Continued)

(58) Field of Classification Search
CPC ........ B23K 26/34–342; B23K 11/0013; B23K 10/027; B33Y 10/30; B33Y 30/00
See application file for complete search history.

(56) References Cited

U.S. PATENT DOCUMENTS

2015/0266211 A1 9/2015 Wolfgang et al.
2017/0246796 A1* 8/2017 Bauer .................. B29C 64/194
(Continued)

FOREIGN PATENT DOCUMENTS

GB 2518044 A 3/2015
NL 2017161 B1 1/2018
WO 2018012974 A1 1/2018

OTHER PUBLICATIONS

International Search Report with Written Opinion for International Application No. PCT/NL2017/050474, dated Sep. 9, 2017, 9 pages.

*Primary Examiner* — Michael A LaFlame, Jr.
(74) *Attorney, Agent, or Firm* — Suiter Swantz pc llo

(57) ABSTRACT

Apparatus for producing an object by means of additive manufacturing, including a process chamber for receiving on a build surface of a build plate a bath of powdered material which can be solidified, a support for positioning the build plate in relation to a surface level of the bath of material, a solidifying device for solidifying a selective part of the material; and a build plate preparation means for preparation of the build surface of the build plate such that the object can be build on the build surface of the build plate. Method of producing an object by means of additive manufacturing on a build surface of a build plate using such an apparatus.

10 Claims, 2 Drawing Sheets

101 115 117 119 105 127 129 123 103 107 131 107a 111 109 113a 109a 113 121 121a 125

(51) Int. Cl.

| | |
|---|---|
| ***B23K 26/34*** | (2014.01) |
| ***B23K 26/342*** | (2014.01) |
| ***B33Y 40/00*** | (2020.01) |
| ***B23K 26/70*** | (2014.01) |
| ***B23K 26/00*** | (2014.01) |
| ***B23K 26/02*** | (2014.01) |
| ***B23K 26/08*** | (2014.01) |

(52) U.S. Cl.
CPC ............ *B23K 26/083* (2013.01); *B23K 26/70* (2015.10); *B33Y 10/00* (2014.12); *B33Y 30/00* (2014.12); *B33Y 40/00* (2014.12)

(56) References Cited

U.S. PATENT DOCUMENTS

| | | | | |
|---|---|---|---|---|
| 2019/0240730 | A1* | 8/2019 | Haider | B28B 1/001 |
| 2020/0276639 | A1* | 9/2020 | Leichtfried | B22F 1/0048 |
| 2021/0031548 | A1* | 2/2021 | Ishizaki | G01B 11/0608 |

* cited by examiner

APPARATUS FOR PRODUCING AN OBJECT BY MEANS OF ADDITIVE MANUFACTURING AND METHOD OF USING THE APPARATUS

CROSS REFERENCE TO RELATED PATENT APPLICATIONS

This application claims the benefit of and priority to International Application No. PCT/NL2017/050474 filed Jul. 13, 2017 which claims priority from NL201761 filed Jul. 13, 2016.

TECHNICAL FIELD AND BACKGROUND OF THE INVENTION

According to a first aspect the invention relates to an apparatus for producing an object by means of additive manufacturing.

According to a second aspect the invention relates to a method of producing an object by means of additive manufacturing on a build surface of a build plate, using an apparatus according to the first aspect.

3D printing or additive manufacturing refers to any of various processes for manufacturing a three-dimensional object. Traditional techniques like injection molding can be less expensive for manufacturing, for example, polymer products in high quantities, but 3D printing or additive manufacturing can be faster, more flexible and less expensive when producing relatively small quantities of three-dimensional objects.

It is anticipated that additive manufacturing becomes more and more important in the future, as the increasing competitive pressure forces companies to not only manufacture more economically with a constant high product quality but also to save time and costs in the area of product development. The life span of products is continuously shortened. In addition to product quality and product costs, the moment of market introduction is becoming increasingly important for the success of a product.

The three-dimensional object may be produced by selectively solidifying, in a layer-like fashion, a powder, paper or sheet material to produce a three-dimensional, 3D, object. In particular, a computer controlled additive manufacturing apparatus may be used which sequentially sinters a plurality of layers to build the desired object in a layer-by-layer fashion. Primarily additive processes are used, in which successive layers of material are laid down under computer control. These objects can be of almost any shape or geometry, and are produced from a 3D model or other electronic data source.

In order to print a three-dimensional object, a printable model is to be created with a computer design package or via a 3D scanner, for example. Usually, the input is a 3D CAD file such as an STL file, a STEP file or a IGS file. Before printing the object from a CAD file, the file is to be processed by a piece of software, which converts the model into a series of thin subsequent layers. Further, apparatus settings and vectors are generated for controlling the creation of each of the subsequent layers.

A laser comprised in the computer controlled additive manufacturing apparatus follows these settings and vectors to solidify successive layers of material to built the 3D object from a series of cross sections. These layers, which correspond to the virtual cross sections from the CAD model, are during this process joined or fused at the same time to create the final 3D object.

To reduce operational costs of the apparatus, it is an object to fully utilize the capacity of the apparatus and, at the same time, make sure that the total production lead time of a three dimensional object is minimized, i.e. the production queue is minimized.

One of the challenges in the manufacturing of three dimensional objects, in particular in additive manufacturing of metal objects, is related to loss of productivity of the apparatus due to removal of the manufactured object. According to prior art practice, an object is manufactured on a build plate, wherein the build plate after manufacturing of the object is replaced by another build plate. Exchanging build plates and preparing them for further use takes a lot of time.

Document US 2015/266211 A1 discloses a system for post-print processing of 3D printed parts that includes an automated breakout system for separating 3D printed parts from printing media in a tray and a vibratory media cleaning system for removing printing media from the 3D printed parts.

Document GB 2 518 044 A discloses a method of additive manufacturing comprising providing a removable support medium having a number of recesses or openings mounted securely on a build platform. In use, none of the powdered material is fused to the build platform; i.e. the article is fused to the support medium rather than the build platform.

BRIEF SUMMARY OF THE INVENTION

It is an object of the invention to provide an apparatus for producing an object by means of additive manufacturing, having an improved productivity.

Thereto, the invention provides an apparatus according to claim 1. The apparatus comprises, a process chamber for receiving a bath of material which can be solidified, in particular a bath of powdered material that can be solidified in order to make metal products. A support is provided for positioning the build plate in relation to the surface level of the bath of material. A solidifying device, such as a laser device, for solidifying a layer of the material on the surface, in particular by means of electromagnetic radiation, is provided. To prepare the build surface of the build plate a build preparation means is provided. With preparation, it is in particular meant: separation of an object from the build surface of the build plate, cleaning and/or levelling the build surface of the build plate, and/or measuring the flatness of the build surface of the build plate.

According to the invention the productivity is improved due to the absence of the need to exchange or remove the build plate. Using the build preparation means, the build surface of the build plate can be prepared while the build plate remains assembled in the apparatus, thereby preventing loss of time due replacement of the build plate.

According to the invention, displacement means are provided for displacing the build plate between a first position wherein the build surface of the build plate is received in the process chamber for receiving on the build surface of the build plate the bath of powdered material which can be solidified and a second position wherein the build surface of the build plate is positioned for preparation of the build surface of the build plate. Moving the build plate from a first position to a second position is beneficial for example to avoid pollution of the apparatus at the first position thereof due to preparation of the build surface of the build plate.

The displacement means further comprise a substantial horizontal axis for rotation of the build plate about said substantial horizontal axis between the first position and second position. A substantial horizontal rotation axis allows for a relative compact design of the apparatus wherein the build surface of the build plate is rotatable out of the first position into the second position.

Advantageous embodiments of the invention will be described below.

In an embodiment of the apparatus, the build plate preparation means comprise a separation device for separation of an object from the build surface of the build plate before building the object. A separation device is beneficial to remove for example a previously manufactured object from the build surface of the build plate without the need to remove the build plate from the apparatus.

In an embodiment the build surface of the build plate is received in a post processing chamber in the second position. Receiving the build surface of the build plate in a post processing chamber is advantageous to reduce pollution from preparation of the build surface of the build plate in the process chamber.

The separation device may be received in the post processing chamber for separation of the object from the build surface of the build plate. Receiving the separation device in the post processing chamber is beneficial to reduce particles originating from the separation device in the post processing chamber.

In an embodiment the build plate preparation means comprise a conditioning device for cleaning and/or levelling the build surface of the build plate. Such a conditioning device is advantageous to provide a required surface finish before manufacturing parts on the build surface of the build plate that require for example a specific roughness or flatness of the build surface.

Preferably, the apparatus comprises first positioning means for relative positioning of the separation device with respect to the build surface of the build plate. Providing first positioning means is advantageous as regards separation of an object manufactured on the build surface.

In an embodiment second positioning means are provided for relative positioning of the conditioning device with respect to the build surface of the build plate. Providing first positioning means is advantageous as regards cleaning and/or levelling of the build surface of the build plate.

It is advantageous if the separation device comprises at least one of a band saw device and an electrical discharge machining (EDM) device. Such devices are advantageous to remove an object from the build surface in a rather reliable and accurate manner.

The conditioning device may comprise at least one of a lathe, a milling device, a grinding device, a turning device or a polishing device.

In a practical embodiment of the apparatus, the apparatus comprises a further build plate having a further build surface for building an object thereon. Providing a further build plate is beneficial to further increase the productivity in that a more continuous operation of the manufacturing process can be achieved by replacing the build plate of which the build surface is received in the process chamber with the further build plate, wherein the further build surface is received in the process chamber after completion of an object on the first build plate.

Preferably, the build plate preparation means comprise a build surface measurement device for measuring the flatness of the build surface of the build plate. A build plate surface measurement device is advantageous to determine the required extent of preparation of the build surface, i.e. the required levelling of the build surface.

According to a second aspect, the invention relates to a method of producing an object by means of additive manufacturing on a build surface of a build plate, using an apparatus according to any of the previous claims, the method comprises the steps of:

receiving the build surface of the build plate in the process chamber;

displacing the build plate between a first position wherein the build surface of the build plate is received in the process chamber for receiving on the build surface of the build plate the bath of powdered material which can be solidified, and a second position wherein the build surface of the build plate is positioned for preparation of the build surface of the build plate, wherein displacing the build plate comprises rotating the build plate about a substantial horizontal axis;

preparing the build surface of the build plate using the preparation means such that the object can be built on the build surface of the build plate.

The advantages of the method are analogue to the advantages of the apparatus.

The step of preparing the build surface of the build plate may comprise at least one of:

separation of an object from the build surface of the build plate;

cleaning and/or levelling the build surface of the build plate;

measuring the flatness of the build surface of the build plate.

BRIEF DESCRIPTION OF THE FIGURES

Embodiments of the invention will be described in the following in connection with the Figures. In the Figures.

DETAILED DESCRIPTION OF THE INVENTION

Figure 1:
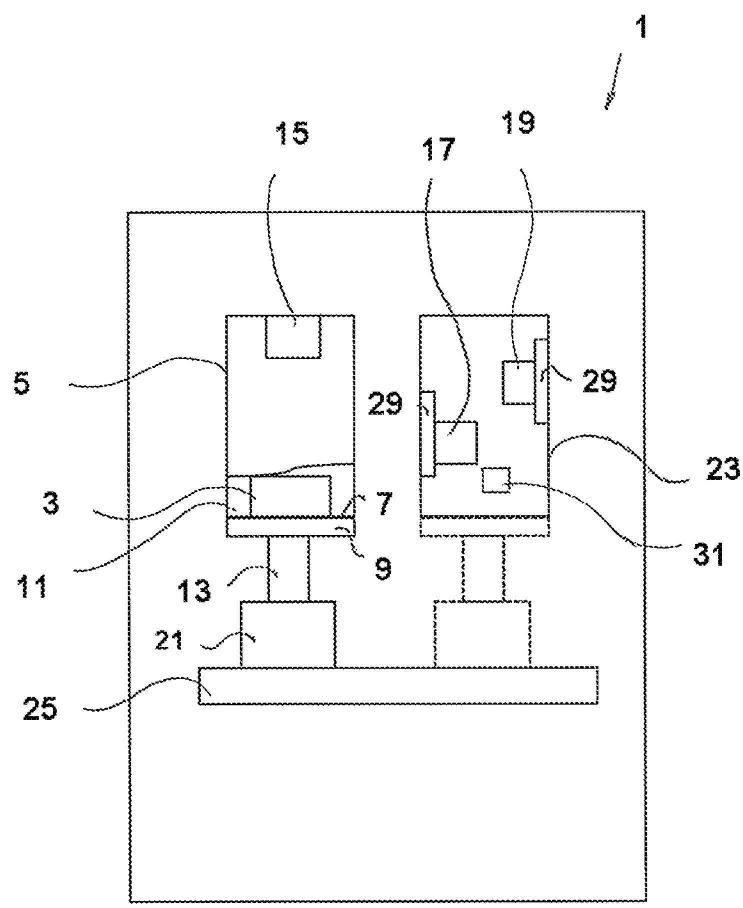
FIG. 1 is a schematic overview of an apparatus according to the present invention for additive manufacturing an object.

FIG. 1 shows an overview of an apparatus 1 for producing an object 3 by means of additive manufacturing. The apparatus 1 comprises a process chamber 5 for receiving a bath of powdered material 11 which can be solidified and a post-processing chamber 23. The bath of powdered material 11 is received on a build surface 7 of a build plate 9. The build plate 9 may be positioned in relation to a surface level L of the bath of material 11 via support 13. The support 13 is movably provided in a shaft 21, such that after solidifying a layer, the support 13 may be lowered, and a further layer of material may be solidified on top of the part of the object 3 already formed. A solidifying device 15 is provided for solidifying a selective part of the material 11. In the embodiment shown, the solidifying device 15 is a laser device, which is arranged for producing electromagnetic radiation in the form of laser light, in order to melt a powdered material 11 provided on the support 13, which then, after cooling forms a solidified part of the object 3 to be produced. However, the invention is not limited to the type of solidifying device.

After an object 3 is manufactured it typically adheres to the build surface 7 of the build plate 9 and needs to be removed from the build surface 7. In addition, the build surface 7 could be damaged from building the object 3 and/or removal of the object 3. For re-use of the build plate 9, build plate preparation means for preparation of the build surface 7 of the build plate 9 are provided such that the object 3 can be built on the build surface 7 of the build plate 9. The plate preparation means comprise a separation device 17, a conditioning device 19 and a measuring device 31. The separation device 17 is designed for separation of an object, for example previously manufactured by means of additive manufacturing, from the build surface 7 of the build plate 9 before building the object 3 for example by sawing or EDM. The conditioning device 19 is designed for cleaning and/or levelling the build surface 7 of the build plate 9 for example using a lathe, a milling device, a grinding device, a turning device and/or a polishing device. The apparatus 1 comprises first positioning means 27 for relative positioning of the separation device 17 with respect to the build surface 7 of the build plate 9. Second positioning means 29 are provided for relative positioning of the conditioning device 19 with respect to the build surface 7 of the build plate 9. The measuring device 31 is designed to measure the flatness of the build surface 7 of the build plate 9. The measuring device 31 is coupled for communication with the separation device 17 and the conditioning device 19 to prepare the build surface 7 in dependence of the measured flatness of the build surface 7 and a required flatness of the build surface 7.

Displacement means 25 are provided for displacing the build plate 9 between a first position wherein the build surface 7 is received in the process chamber 5 and a second position, indicated in FIG. 1 using dashed lines, wherein the build surface 7 is received in the post-processing chamber 23 for preparation of the build surface 7. The separation device 9 is received in the post-processing chamber 23.

Figure 2:
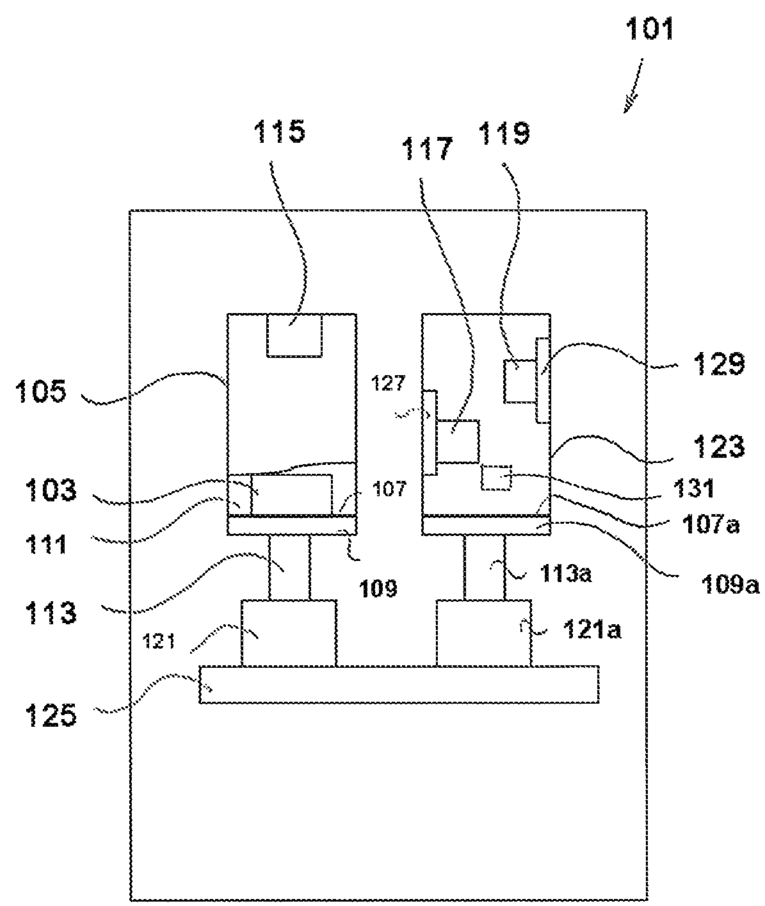
FIG. 2 is a schematic overview of a further apparatus according to the present invention for additive manufacturing an object.

In a the further embodiment shown in FIG. 2, the apparatus 101 is provided with a further build plate 109*a* provided with a further build surface 107*a*. Build plate 109*a* is similar to build plate 109 and may be used in a similar way in the apparatus 100. The build plate 109*a* may positioned via support 113*a*, wherein support 113*a* is movably provided in a shaft 121*a*. Elements of apparatus 101 similar to elements of apparatus 1 have a reference numeral raised by 100. The further build plate 109*a* may be displaced by displacement means 125 between the first position and the second position such that either the build surface 107*a* of the further build plate 109*a* or the build surface 107 of the build plate 109 is received in the process chamber 105. This is beneficial for preparing build surface 107 while manufacturing an object 103*a* on build surface 107*a*, or preparing build surface 107*a* while manufacturing an object 103 on build surface 107.

The invention claimed is:

1. An apparatus for producing an object by an additive manufacturing process, the apparatus comprising:

a process chamber for receiving on a build surface of a build plate a bath of powdered material configured to be solidified;

a support including a post movably provided in a shaft operable for positioning the build plate in relation to a surface level of the bath of powdered material;

a solidifying device including a laser for solidifying a selective part of the bath of powdered material;

a build plate preparation assembly including a separator device, a conditioning device, and a build surface measurement device, the build plate preparation assembly operable for preparing the build surface of the build plate such that the object can be built on the build surface of the build plate; and a displacement device including a movable platform supporting the shaft, the displacement device operable for displacing the build plate between a first position wherein the build surface of the build plate is received in the process chamber for receiving on the build surface of the build plate the bath of powdered material configured to be solidified, and a second position wherein the build surface of the build plate is positioned for preparation of the build surface of the build plate, the movable platform comprising a horizontal axis for rotation of the build plate about the horizontal axis between the first position and the second position.

2. The apparatus according to claim 1, wherein the separation device comprises a saw or an electrical discharge machine (EDM) device configured to separate an object from the build surface of the build plate before building a next object.

3. The apparatus according to claim 1, wherein in the second position the build surface of the build plate is positioned in a post-processing chamber.

4. The apparatus according to claim 3, wherein the separation device is positioned in the post-processing chamber.

5. The apparatus according to claim 1, wherein the conditioning device comprises at least one of a lathe, a milling device, a grinder, a turning device, and a polisher configured to at least one of clean and level the build surface of the build plate.

6. The apparatus according to claim 2, wherein each of the separation device and the conditioning device are positionable relative to the build surface of the build plate.

7. The apparatus according to claim 1, further comprising a second build plate having a second build surface for building an object thereon.

8. The apparatus according to claim 1, wherein the measurement device is operable for measuring flatness of the build surface of the build plate and is communicatively coupled to the separation device.

9. A method for producing an object by an additive manufacturing process on a build surface of a build plate using an apparatus comprising:

a process chamber for receiving on a build surface of a build plate a bath of powdered material configured to be solidified;

a support including a post movably provided in a shaft operable for positioning the build plate in relation to a surface level of the bath of powdered material;

a solidifying device including a laser for solidifying a selective part of the bath of powdered material;

a build plate preparation assembly including a separator device, a conditioning device, and a build surface measurement device, the build plate preparation assembly operable for preparing the build surface of the build plate such that the object can be built on the build surface of the build plate; and a displacement device including a movable platform supporting the shaft, the displacement device operable for displacing the build plate between a first position wherein the build surface of the build plate is received in the process chamber for receiving on the build surface of the build plate the bath of powdered material configured to be solidified, and a second position wherein the build surface of the build plate is positioned for preparation of the build surface of the build plate, the movable platform comprising a horizontal axis for rotation of the build plate about the horizontal axis between the first position and the second position;

the method comprising the steps of:

receiving the build surface of the build plate in the process chamber;

displacing the build plate between a first position wherein the build surface of the build plate is received in the process chamber for receiving on the build surface of the build plate the bath of powdered material configured to be solidified, and a second position wherein the build surface of the build plate is positioned for preparation of the build surface of the build plate, wherein displacing the build plate comprises rotating the movable platform; and preparing the build surface of the build plate using the build plate preparation assembly such that the object can be built on the build surface of the build plate.

10. The method according to claim 9, wherein the step of preparing the build surface of the build plate comprises at least one of:

separating an object from the build surface of the build plate;

at least one of cleaning and leveling the build surface of the build plate; and measuring flatness of the build surface of the build plate.

* * * * *